United States Patent
Kim (10) Patent No.: US 11,636,275 B1
(45) Date of Patent: Apr. 25, 2023

(54) NATURAL LANGUAGE PROCESSING SYSTEM AND METHOD USING A SYNAPPER MODEL UNIT

(71) Applicant: Min Ku Kim, Bellingham, WA (US)

(72) Inventor: Min Ku Kim, Bellingham, WA (US)

(*) Notice: Subject to any disclaimer, the term of this patent is extended or adjusted under 35 U.S.C. 154(b) by 0 days.

(21) Appl. No.: 17/984,711

(22) Filed: Nov. 10, 2022

(30) Foreign Application Priority Data

Aug. 2, 2022 (KR) .................. 10-2022-0096224

(51) Int. Cl.
*G06F 40/58* (2020.01)
*G06F 40/211* (2020.01)

(52) U.S. Cl.
CPC ............ *G06F 40/58* (2020.01); *G06F 40/211* (2020.01)

(58) Field of Classification Search
CPC .............................. G06F 40/58; G06F 40/211
See application file for complete search history.

(56) References Cited

U.S. PATENT DOCUMENTS

| | | | | |
|---|---|---|---|---|
| 4,914,590 A | * | 4/1990 | Loatman | G06F 40/35 704/8 |
| 7,433,893 B2 | * | 10/2008 | Lowry | G06F 16/316 |
| 11,119,985 B1 | * | 9/2021 | Alagianambi | G06F 9/541 |
| 11,250,842 B2 | | 2/2022 | Kim | |
| 2008/0310724 A1 | * | 12/2008 | Okumura | G06F 40/53 715/256 |
| 2020/0243076 A1 | | 7/2020 | Kim | |
| 2021/0303786 A1 | * | 9/2021 | Veyseh | G06F 40/284 |
| 2022/0050967 A1 | * | 2/2022 | Veyseh | G06F 40/289 |
| 2022/0277738 A1 | * | 9/2022 | Aher | G06F 16/2457 |

* cited by examiner

*Primary Examiner* — Anne L Thomas-Homescu
(74) *Attorney, Agent, or Firm* — Walter J. Tencza, Jr.

(57) ABSTRACT

Disclosed herein are a natural language processing system and method, more particularly a natural language processing system and method using a synapper model unit.

19 Claims, 4 Drawing Sheets

NATURAL LANGUAGE PROCESSING SYSTEM AND METHOD USING A SYNAPPER MODEL UNIT

CROSS REFERENCE TO RELATED APPLICATION(S)

The present application claims the priority of South Korean (the Republic of Korea) patent application no. 10-2022-0096224, filed on Aug. 2, 2022, by inventor Min Ku Kim.

TECHNICAL FIELD

The present invention generally relates to a natural language processing system and method, more particularly to a natural language processing system and method using a synapper model unit.

BACKGROUND

Natural language processing is performed using elemental techniques including natural language analysis, natural language understanding, natural language generation and the like, and is applied to various fields including information retrieval, machine translation, Q&A, and the like.

Machine translation using a typical natural language processing method can generate inaccurate or incomprehensible sentences.

For more correct natural language processing, various natural language processing processes can be carried out and natural language processing may employ natural language analysis, natural language understanding, natural language generation, and the like.

Natural language analysis is a technique of analyzing meanings of natural language, natural language understanding is a technique of allowing a computer to operate in response to input data presented in natural language, and natural language generation is a technique of converting video or display content into natural language that humans can understand.

In recent years, natural language processing employs a neural network model.

Despite improved performance in semantic parsing in natural language processing, the neural network model cannot provide high accuracy and is driven by inconsistent operation when there is little source data. In addition, since the neural network model requires very fast computer performance and huge power consumption, there are several practical difficulties.

RELATED LITERATURE

Patent Document

Korean Patent Laid-open Publication No.10-2022-0049693 (Apr. 22, 2022)

SUMMARY

It is an object of the present invention to provide a natural language processing system and method, which enables natural language processing with high accuracy and consistency at a very rapid speed using a synapper model unit even without big data.

The present invention is not limited to the above object and other objects of the present invention will become apparent from the following description.

In accordance with one aspect of the present invention, a natural language processing method using a synapper model unit includes: a preprocessing step in which text written or pronounced in natural language is received and converted into a sentence composed of words; a first conversion step in which each of the words of the sentence converted in the preprocessing step is converted into a neural concept code through a first code converter (WNC); a synapper model input step in which the neural concept codes converted in the first conversion step are input to a synapper model of a language processing unit; a parsing/output step in which the neural concept codes recognized through the synapper model of the language processing unit are parsed and output; a second conversion step in which the neural concept codes parsed by and output from the language processing unit are converted into words through a second code converter (NWC); and a parsed data output step in which data converted in the second conversion step are output as parsed data.

Preferably, the first conversion step includes converting the input words into binary/decimal number codes.

Preferably, in the first conversion step, first two digits of the decimal number code represent a part-of-speech upon conversion of the input words into the decimal number codes.

Preferably, in the parsing/output step, the part-of-speech of each neural concept code (NCC) in a register set is parsed to determine the correct interpretation of the sentence.

Preferably, in the parsing/output step, when all words of the sentence are converted into the neural concept codes (NCC) in the first conversion step, a syntactic structure of the sentence is determined and parsed in the synapper model to be output as parsed neural concept codes (NCC).

Preferably, in the parsing/output step, a cache memory temporarily stores data parsed through the synapper model before output of the data.

Preferably, in the parsing/output step, a text random access memory (TRAM) stores synapper model data so as to allow access to a large amount of sentences difficult to process in the cache memory.

Preferably, in the parsing/output step, a storage device including a flash memory stores a sentence containing important information so as to allow access to the sentence later.

Preferably, in the parsing/output step, the synapper model divides the text into sentences each composed of words and expressed in various ways in natural language and determines which of the words are branches and which of the words are nodes based on parts-of-speech of each word and adjacent words thereto in the sentence.

Preferably, in the parsing/output step, the synapper model connects the nodes to each other in a first direction while connecting the branches to the corresponding nodes in a direction different from the first direction after determining the nodes and the branches.

In accordance with another aspect of the present invention, a natural language processing system using a synapper model includes: an input unit to which natural language is input; an analog-to-digital converter (ADC) converting analog data input to the input unit into digital data; a first code converter (WNC) converting the digital data into neural concept codes; a language processing unit receiving the neutral concept codes from the first code converter (WNC) to parse and output the neutral concept codes through a synapper model; a second code converter (NWC) converting the parsed neural concept codes output from the language processing unit into parsed word data; a digital-to-analog converter (DAC) converting the digital data converted through the second code converter (NWC) into analog data; and an output unit outputting the analog data converted through the digital-to-analog converter (DAC) to provide parsed data in natural language.

According to the present invention, the system and method enables natural language processing with high accuracy and consistency at a very rapid speed even without big data upon natural language processing using a synapper model unit.

BRIEF DESCRIPTION OF THE DRAWINGS

The above and other aspects, features, and advantages of the present invention will become apparent from the detailed description of the following embodiments in conjunction with the accompanying drawings.

DETAILED DESCRIPTION OF EMBODIMENTS

Hereinafter, embodiments of the present invention will be described with reference to the accompanying drawings.

It should be understood that the present invention is not limited to the following embodiments and may be embodied in different ways, and that the embodiments are provided for complete disclosure and thorough understanding of the present invention by those skilled in the art. The scope of the present invention is defined only by the claims.

Description of known functions and constructions which may unnecessarily obscure the subject matter of the present invention will be omitted.

There are many natural languages in the world. Since these natural languages make use of sentences in various word orders, there are many difficulties in translation or sentence processing. Different sentence structures of these languages can be integrated into one unified structure system using multiple dimensions.

Herein, source data may mean data including text data used in natural language processing.

Figure 1:
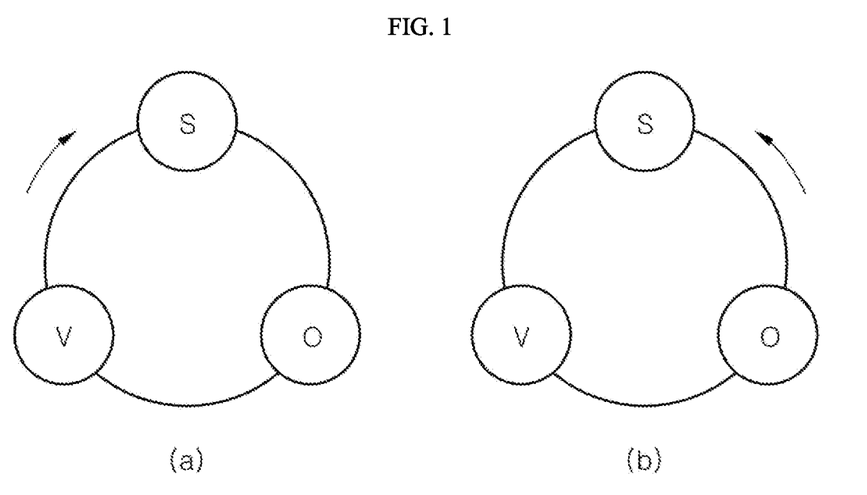
FIG. 1 is a diagram illustrating an integrated state of word orders for natural languages.

As shown in FIG. 1, depending on languages, words are arranged in different orders to form sentences. Thus, languages are regarded as having different grammars. For example, languages, such as Korean and English, appear to have little grammatical commonality, since word orders are fundamentally different in these languages. The word order of each language varies depending on the word order in which the subject, object, and verb are arranged.

That is, among the six word orders SOV, SVO, OVS, VOS, VSO, and OSV, Korean uses SOV (subject-object-verb) as a fundamental word order whereas English and other Western European languages generally use SVO (subject-verb-object) as the fundamental word order. When three tokens, that is, the subject, object and verb, are connected in a circular shape, the number of combination methods is reduced from 6 to 2.

FIG. 1(a) shows the word orders SOV, OVS, VSO in which the tokens move in the clockwise direction. Conversely, FIG. 1(b) shows the word orders SVO, VOS, OSV in which the tokens move in the counterclockwise direction. Except for the direction in which the tokens move, the two circles have the same structure. It can be seen that all word orders of natural languages are present in this single structure.

Here, even if an arrangement order of words in each language is changed, the meaning of a sentence composed of the words does not change.

A synapper model is completed by connecting words in various dimensions.

Referring to FIG. 2 to FIG. 6, a natural language processing system and method using a synapper model according to the present invention will be described.

Figure 2:
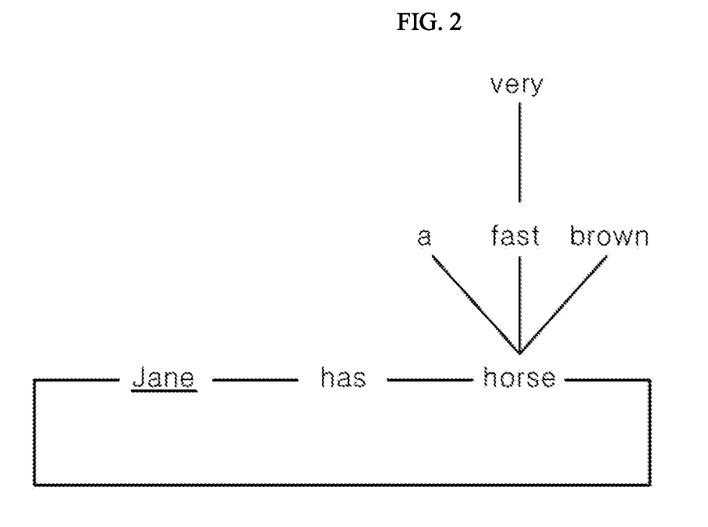
FIG. 2 and FIG. 3 are conceptual views of synapper models according to embodiments of the present invention.

Referring to FIG. 2, a sentence starts with the subject 'Jane' and completes an English sentence when words in the sentence are arranged from the subject in the clockwise direction.

On the other hand, a Korean or Japanese sentence may be output when the words in the sentence are arranged from the subject in the counterclockwise direction.

Specifically, English: Jane has a very fast brown horse.

Korean: Jane (a) very fast brown horse has.

제인은 매우 빠른 갈색 말을 가졌다.

Japanese: Jane (a) very fast brown horse has.

ジェーンはとても早い茶色の馬を持っている。

Since an article is omitted in Korean or Japanese, 'a' can be removed. In some languages, a modifier may be placed after a modificand. In that case, a processing order may be changed to process the modifier after the modificand. In this way, when a general narrative sentence is applied to the synapper model, it is possible to determine a sentence structure.

In this structure, a correct sentence can be determined regardless of language through arrangement of words according to the word order. That is, it is possible to extract a commonly used one-dimensional sentence through an n-dimensional sentence structure.

That is, the problem with expression of personal thoughts through writing is that the more words, the more complex the sentences for parsing. This is because all words are written in the same direction or dimension. Through a synapper model, the syntactic structure of the sentence becomes much more intuitive using two or more directions or dimensions.

The synapper model used herein is a model-based method for conversion of a traditional (one-dimensional or linear) sentence into a multi-dimensional sentence structure.

Language, That is, the synapper model depends upon processing in order to realize multi-dimensional expression of a sentence.

The synapper model processes and suggests sentences based on an assumption about how sentences (thoughts) are structured by the human brain, that is, how the human brain forms sentences. Once a sentence (that is, an idea or concept behind the sentence) is processed and suggested in a synapse form or model, the sentence is easily recreated or rendered into a sentence in almost any target language for translation and interpretation.

First, a sentence is provided with the structure of the synapper model. That is, the synapper model processes text to determine a part-of-speech of each word through learning data (verb database, adjective database, data source supplied through ISP, and the like) according to the present invention.

Next, the synapper model parses parts-of-speech of words before and after each word in a sentence under processing to determine which of the words is a branch and which of the words is a node.

Here, the node means a word pertaining to a main loop.

In addition, the branch means a supplementary word related to one particular node.

Then, the synapper model connects all nodes to one another in one direction and connects branch words to the nodes in different direction(s).

Then, a type of sentence is determined based on the synapper model.

That is, all branch words may be removed by processing the sentence in the synapper model.

A remaining part of the sentence (simple node) is regarded as a key sentence based on the synapper model. This may be further processed according to a creative principle in order to further remove an original sentence of the source data language as a part-of-speech of a node.

Thereafter, based on this information, the synapper model may determine whether the corresponding sentence is a question, a simple sentence, or something else (that is, a different type of sentence structure).

Sentences processed using the synapper model may be regarded as sentences or commands. Thereafter, an improvised sentence model may be further parsed for content, such as identification of the subject, verb phrases, and the rest of the sentence.

In addition, all nodes may be present in one dimension whereas branch words are not necessarily present in one dimension. This presupposes an understanding that the human brain is likely to use multiple dimensions for the branch words.

For example, words are determined as nodes or branches according to their relationship with other words in a corresponding sentence by the synapper model.

For example, when an adjective is followed by another adjective or noun, the adjective becomes a branch word (e.g., fast car).

In addition, when an adjective is not followed by another adjective or noun, the adjective becomes a node (e.g., car is fast).

As described above, in the natural language processing method using the synapper model, all languages have only six (6) word orders.

Among SOV, SVO, OSV, OVS, VSO and VOS, three orders have tokens moving in one direction (clockwise direction) and the other three orders have tokens moving in an opposite direction (counterclockwise direction).

Accordingly, at least in theory, it is possible to translate a sentence into any natural language so long as the sentence has a correct structure.

The synapper model provides a correct structure to the sentence. In addition, the synapper mode is able to process the sentence without relying on a specific language by converting each of words in the sentence into a specific numeric code, that is, a neural concept code.

This feature is distinguished from a common practice of translation of each word in a specific language (i.e. source language) into a word in another language (i.e. target language).

This is because many words have various meanings, causing mistranslation.

Figure 4:
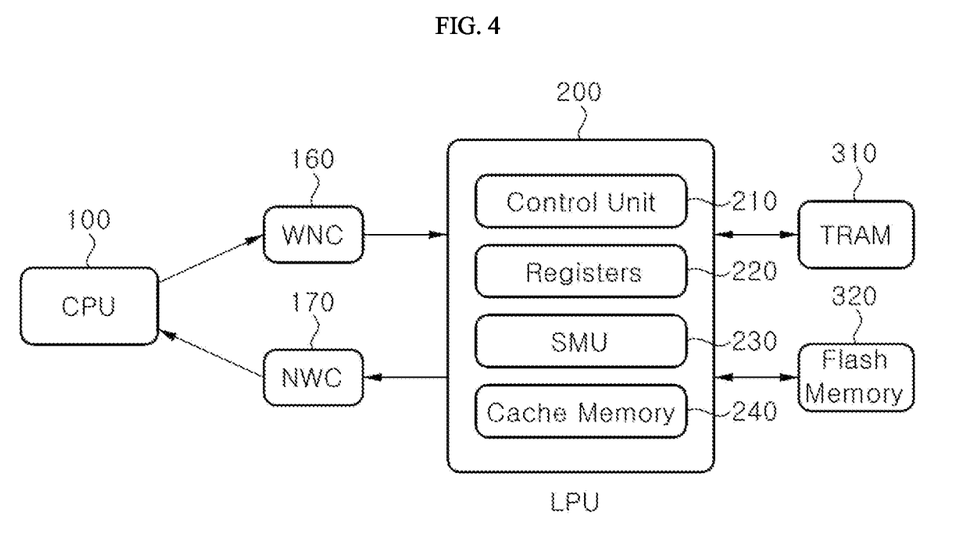
FIG. 4 is a view of a natural language processing system using a synapper model unit according to one embodiment of the present invention.
Figure 5:
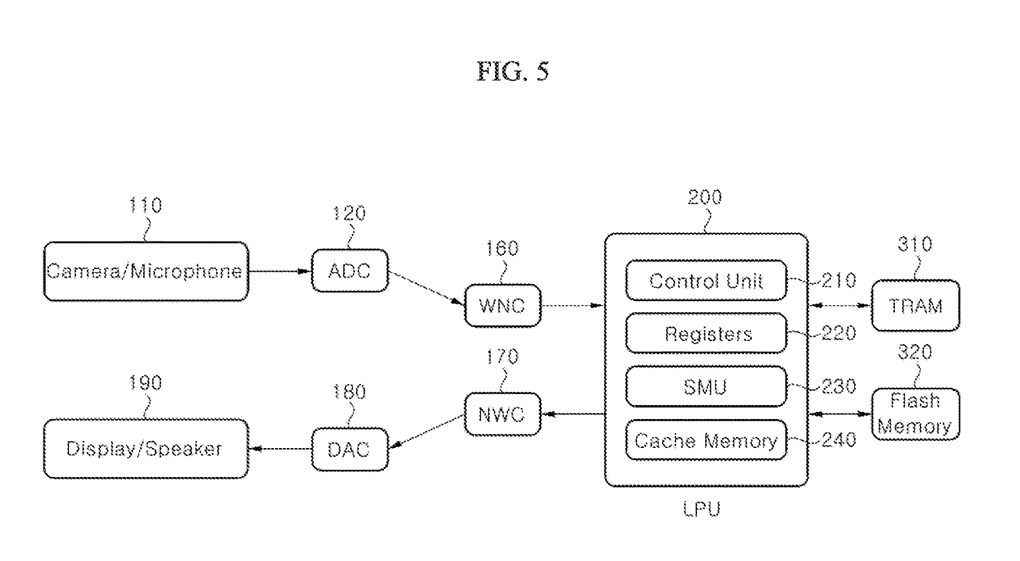
FIG. 5 is a view of a natural language processing system using a synapper model unit according to another embodiment of the present invention.

FIG. 4 to FIG. 5 show natural language processing systems using synapper models according to the present invention.

Referring to FIG. 4 to FIG. 5, words are extracted from natural language text input to a CPU (central processing unit) 100 and are converted into neural concept codes through a first code converter (WNC: word-to-NCC converter) 160.

Next, data of the neural concept codes are input to a language processing unit (LPU) 200, which performs natural language processing of the neural concept codes and outputs the processed neural concept codes to a second code converter (NWC: NCC-to-word converter) 170.

In the second code converter 170, the neural concept codes subjected to natural language processing and output from the language processing unit 200 may be converted into words.

The words converted by the second code converter 170 are sent to the CPU 100, which outputs a translation result through natural language processing (translation) of the natural language text input to the CPU.

Here, the neural concept code may mean 32 bit binary codes representing a neural concept.

The binary codes may be represented by decimal numbers, in which the first two digits may be used to represent a part-of-speech.

The next 8 digits may be used to represent a specific neural concept.

The NCC may be expressed as 32 binary numbers and 4,294,967,295 decimal numbers as follows.

1111 1111 1111 1111 1111 1111 1111 1111 (binary)
4294967295 (decimal number)

In the decimal numbers, the first two digits may be used to represent a part-of-speech. The remaining 8 digits may be used to represent a specific neural concept.

For example, 0001001732 (decimal number) is an NCC meaning "taxi driver" and 0500008055 (decimal number) means "promise".

In the first NCC, the first two digits 00 represent that the neural concept is a noun. In the second NCC, the first two digits 05 represent that the neural concept is a verb.

There is one schema in which two digits are used to represent a part-of-speech.

Specifically, two digits may represent as follows: 00=Noun, 05=Verb, 10=Adjective, 15=Adverb, 20=Preposition, 22=Conjunction, and 30=Exclamation.

However, parts-of-speech, such as conjunction and exclamation, require hundreds of neural concepts. Among all languages, the part-of-speech that requires the largest number of neural concepts is a noun. A neural concept code capable of representing nearly 100 million (exactly 94,967,295) noun neural concepts may be sufficient for all practical purposes.

NCC is somewhere between what humans understand (words) and what machines understand (binary numbers). It is similar to using a programming language such as C such that humans and computers can understand each other. This is why the neural concept code (NCC) is expressed as decimal numbers. Otherwise, humans cannot find a meaning in a code. However, computers can process only binary numbers. Therefore, there is a need for an additional step of parsing the first two digits of a neural concept code (NCC) composed of decimal numbers into binary. For example, 220007710 mean a neural concept code (NCC). In this neural concept code, the first two digits 22 indicate a conjunction. It is easy for humans to know what a part-of-speech is. However, it is necessary for the computers to parse this information into binary. Accordingly, 6 bits are needed to obtain the first two digits.

In a neural concept code (NCC), the numbers that represent parts-of-speech are between 00 and 42. For example, the number 22 is 010110. Logic gates are used to process sentences by analyzing this kind of information. The rest of the neural concept code (NCC) is mostly irrelevant to processing and should be ignored.

When all words in a sentence are converted into neural concept codes (NCC), a syntactic structure of the sentence may be determined and converted into a synapper model 230. In the neural concept code (NCC), the synapper model of the sentence is like having a blueprint for a machine. Since the synapper model contains enough information for sentence parsing, the synapper model can be applied to translation, reading comprehension, conversion, and the like even without using machine learning technology.

With this structure, natural language can be processed by a language processing unit (LPU) 200. The language processing unit can process languages with power efficiency at very high speeds even without big data. This is similar to how an Arithmetic Logic Unit (ALU) can output mathematical calculations at very high speeds with very little power.

The result of this step may be more accurate than currently available machine learning algorithms for natural language processing (NLP). This is due to a synapper model unit (SMU), which is presumed to process language in a way similar to the human brain.

On the other hand, the machine learning algorithms inherently compute probabilistic predictions and thus cannot always produce correct results.

The language processing unit (LPU) 200 may include a control unit 210, a register 220, a synapper model unit (SMU) 230, and a cache memory 240.

The control unit 210 may control the register 220, the synapper model unit 230, and the cache memory 240.

The register 220 puts a sentence received from the CPU 100 into a register set. Initially, the register set is a converted neural concept code (NCC) text string sequentially combined by ignoring punctuation, such as commas, periods, and question marks.

In this simple register set, a part-of-speech of each neural concept code (NCC) is parsed to determine a correct synapper model for the sentence.

For example, in a sentence "The three musketeers is a very good book," the first three words (The three musketeers) may be regarded as three individual words. However, these words represent a single neural concept indicating a book having the same name as the three individual words.

Accordingly, the three musketeers may be reduced to a single neural concept code (NCC).

00--------05--------11--------15--------10--------00--------

This NCC text string includes parts-of-speech of the sentence as follows: Noun (00)+Verb (05)+Determiner (11)+Adverb (15)+Adjective (10)+Noun (00) (the remaining 8 digits are unrelated). When this information is input to the register, the register forms syntactic relationships between words using logic gates. For example, a combination of adverb+adjective+noun ("very good book") indicates that these words should be grouped together as one node. Through an AND gate, the NCC text string may be changed to:

00---------05---------11--------,    15--------+10-------- |00--------

T.T.M.–is–a , very+good|book

Figure 3:
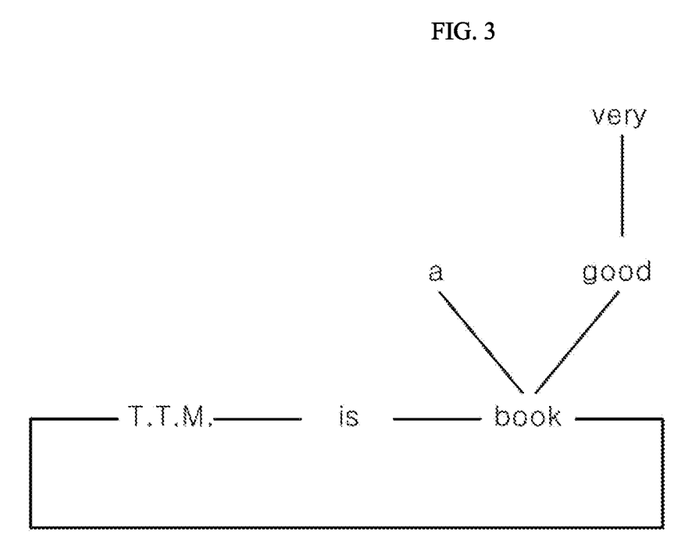

That is, as shown in FIG. 3,

–(dash)=connect nodes laterally (e.g., "is–book").

|(bar)=connect a node to a branch (e.g., "a|book").

, (comma)=The next token is also a branch but not in the same dimension (e.g., "a, good").

+(addition)=connects nodes or branches pertaining to the same dimension to each other (e.g., "매우 + 좋음").

That is, 15 AND 10 indicates "15+10" and 10 AND 00 indicates "10|00." (This is a default. The same result must be provided for all instances of "10 AND 00".) Accordingly, all three words indicate "15+10|00" or " 매우 + 좋음 | 책." This result is similar to a result obtained using the logic gate.

Calculation is performed using symbols such as addition and subtraction.

In order to store a sentence as a synapper model, there is a need for 7 register sets.

PNP+PVP+SP+CE 1+CE 2+CE 3+CE 4

A common sentence is divided into basic noun phrases (PNP), basic verb phrases (PVP), and sub-predicates (SP). One complementary element (CE) may be arranged first and foremost.

The other two complementary elements may be placed between PNP, PVP and SP. In SVO, the sentence is displayed as follows.

CE 1+PNP+CE 2+PVP+CE 3+SP+CE 4

The next is an exemplary sentence including all 7 parts:

Once upon a time, a dragon, female, flew, while blowing fire, over the mountain, supposedly. ( 옛날 옛적에 암컷 용이 아마도 불을 불며 산을 넘어 날아갔습 니다.)

A core sentence (PNP+PVP+SP) is simply " 용이 산을 넘어 날이 갔습니다."

A selective phrase or clause (CE) may be added to the start ("Once upon a time"), between PNP and PVP ("female"), between PVP and SP ("while blowing fire"), and the end ("supposedly"). In order to secure a sufficient space capable of storing NCC in each category, the following is suggested.

PNP: 25×(32 bit NCC+2 bit S+1 bit P)+1 bit V=876 bits
PVP: 15×(32 bit NCC+2 bit S+1 bit P)+1 bit V=526 bits
SP: 40×(32 bit NCC+2 bit S+1 bit P)+1 bit V=1,401 bits
CE: 20×(32 bit NCC+2 bit S+1 bit P)+1 bit V=701 bits
(total 2,804 bits)

When all bits are added, the total is 5,607 bits. However, a 3-bit code register is also required between neural concept codes (NCC) so as to allow the neural concept codes (NCC) to be linked together in a specific way.

As a result, 72 bits, 42 bits, 117 bits and 228 bits are added to PNP, PVP, SP and each of four 4 CE, respectively. Accordingly, there is a need for a 6,066-bit register in order to store a single synapper model.

A 2-bit supplementary register (S) is required to store information, such as the gender of a noun (e.g., female) or the tense of a verb (e.g., past tense). This register may also be used to indicate whether an adjective is comparative, superlative, or neither.

A 1-bit register (P) is required to determine plural nouns (e.g., fruit versus fruits). This register may also be used to indicate a conjugation of a verb or an inflection condition of a verb (e.g., go/goes). A 1-bit register (V) is required to indicate overflow.

An option register may be used to figure out more about each sentence as follows:

Sentence type (2 bit): declarative, interrogative, etc.
Content type (6 bit): general, conversational, casual, formal, legal, physics, etc.
Language type (9 bit): en, en-uk, en-us, fr-fr, fr-ca, etc.
Word order (3 bit): SVO, SOV, etc.
Subject (32 bit): noun to which a pronoun refers (e.g., he ->John)
Object (32 bit): noun to which a pronoun refers (e.g., it ->bird)
Verb (32 bit): Verb to which a supplementary verb refers (e.g., did ->walked)

This specific register (total 116 bits) changes conditions only when a sentence is changed.

The cache memory 240 temporarily stores the processed sentence to generate an output. The cache memory 240 of the language processing unit (LPU) 200 is required to have a large space capable of storing sentences of one or two paragraphs.

Sometimes, there is a need for access to all sentences in a book. That is, tens of thousands of sentences are required to be stored in a text random access memory (TRAM) 310 specially designed to store synapper model data.

TRAM 310 for the language processing unit 200 may be considered as the same concept as VRAM for a GPU.

That is, the cache memory 240 of the language processing unit 200 may store the sentences of one or two paragraphs and TRAM 310 is used to store several sentences.

In addition, a flash memory 320 may later access sentences containing important information. In this way, the language processing unit 200 may not only process a language but also answer a question.

The human brain has a language processing unit ("language capacity") and memory. By storing a synapper model of a sentence considered to be important in the flash memory 320, the language processing unit 200 may act like the human brain.

Referring to FIG. 5, the natural language processing system using a synapper model according to the present invention may include: an input unit 110, such as a camera, a microphone, and the like, to which natural language is input; an analog-to-digital converter (ADC) 120 converting analog data input to the input unit 110 into digital data; a first code converter (WNC) 160 converting the digital data into neural concept codes; a language processing unit 200 receiving the neural concept codes from the first code converter (WNC) 160 to parse and output the neutral concept codes through a synapper model unit (SMU); a second code converter (NWC) 170 converting the parsed neural concept codes output from the language processing unit 200 into parsed word data; a digital-to-analog converter (DAC) 180 converting the digital data converted through the second code converter (NWC) 180 into analog data; and an output unit 190, such as a display and a speaker, outputting the analog data converted through the digital-to-analog converter (DAC) 180 to provide parsed data in natural language.

Figure 6:
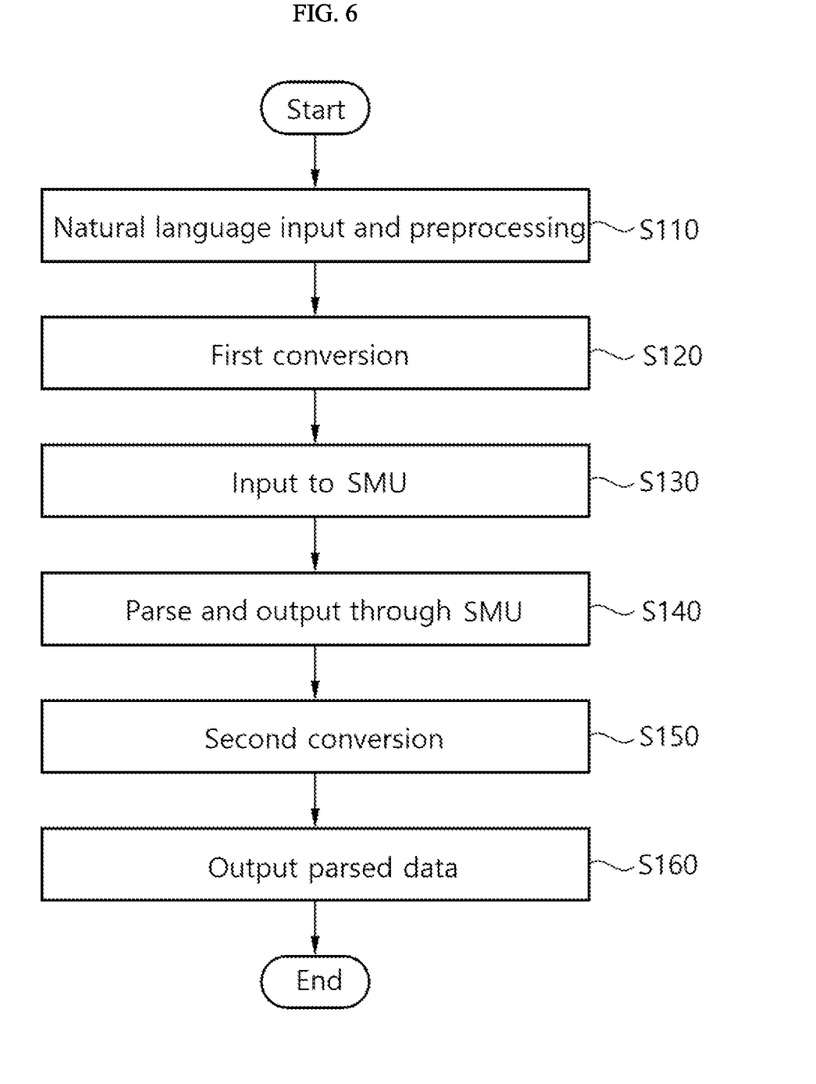
FIG. 6 is a flowchart of a natural language processing method using a synapper model unit according to one embodiment of the present invention.

Referring to FIG. 6, the natural language processing method using a synapper model unit according to the present invention includes: a preprocessing step S110 in which text written or pronounced in natural language, that is, source data, is received and converted into a sentence composed of words; a first conversion step S120 in which each of the words of the sentence converted in the preprocessing step S110 is converted into a neural concept code through a first code converter (WNC); a synapper model unit input step S130 in which the neural concept codes converted in the first conversion step S120 are input to a synapper model unit of a language processing unit (LPU) 200; a parsing/output step S140 in which the neural concept codes recognized through the synapper model unit (SMU) of the language processing unit are parsed and output; a second conversion step S150 in which neural concept codes of data parsed by and output from the language processing unit are converted into words through a second code converter (NWC); and a parsed data output step S160 in which data converted in the second conversion step S150 are output as parsed data.

In the natural language processing method using synapper models, the first conversion step S120 may include converting the input words into binary/decimal number codes.

Upon conversion of the input words into the decimal number codes, the first two digits may represent a part-of-speech.

In the parsing/output step S140, the part-of-speech of each neural concept code (NCC) in a register set may be parsed to determine the correct interpretation of the sentence.

In addition, in the parsing/output step S140, when all words of the sentence are converted into the neural concept codes (NCC) in the first conversion step S120, a syntactic structure of the sentence may be determined and parsed in the synapper model unit (SMU) to be output as parsed neural concept codes (NCC).

Further, in the parsing/output step S140, the cache memory 240 may temporarily store the data parsed through the synapper model unit before output of the data.

Further, in the parsing/output step S140, the text random access memory (TRAM) 310 stores synapper model data so as to allow access to a large number of sentences difficult to process in the cache memory 240.

Further, in the parsing/output step S140, when the flash memory 320 is used, the flash memory 320 may store a sentence containing important information so as to allow access to the sentence later.

Further, in the parsing/output step S140, the synapper model may divide the text into sentences each composed of words and expressed in various ways in natural language and may determine which of the words are branches and which of the words are nodes based on parts-of-speech of each word and adjacent words thereto in the sentence.

Further, in the parsing/output step S140, the synapper model may connect the nodes to each other in a first direction while connecting the branches to the corresponding nodes in a direction different from the first direction after determining the nodes and the branches.

More specifically, upon processing a Korean sentence, for example, "영희가 철수 집에 갔다", in the natural language processing method using a synapper model unit (SMU), the data is received in the form of text from the CPU or another source.

When the received data is not text, the received data is converted into text.

Since this sentence is composed of typical words, the words are converted into neural concept codes (NCC) by the first code converter (WNC) 160 in the first conversion step S120.

Here, all postpositional particles may be removed.

영희(가) 철수 집에 갔다

→ 영희 철수 집에 갔다

→0012334534 0035475344 0084023453 2048554671 0587335288

These neural concept codes are expressed in decimal numbers for easy understanding by humans and processing may be carried out on binary numbers. Accordingly, the corresponding data are sent to the language processing unit (LPU) to be sent to the register 220 through the control unit 210.

PNP: 0012334534
PVP: 0587335288
SP: 0035475344 0084023453 2048554671

Then, the synapper model unit (SMU) generates parsed data based on the corresponding data.

For example, according to a rule in which, if a noun is followed by another noun, the other noun is treated as a branch (if Word03 and Word04="noun" then . . . ), it is determine how each NCC is connected. Then, the words are arranged in a sentence according to a correct order. For the purpose for translation of the sentence into an English sentence, the synapper model is set as follows.

(CE 1)+PNP+(CE 2)+PVP+(CE 3)+SP+(CE 4)
0012334534+0587335288+2048554671+0035475344+0084023453
0012334534–0587335288–2048554671–0035475344|0084023453

Next, the synapper model is sent to the cache memory. In addition, the synapper model may be stored in TRAM, as needed.

In this embodiment, since the task is finished, the corresponding data is sent from the language processing unit (LPU) to a second code converter (NWC) 170.

The second code converter 170 converts the neural concept codes (NCC) into English words.

0012334534–0587335288–2048554671–0035475344|0084023453 younghee–went–to–cheolsoo|house

The CPU 100 receives and converts the output data into a general linear sentence structure. Rules specific to a specific language are modified according to grammar of each language through various methods in the CPU.

younghee went to cheolsoo house
→Younghee went to Cheolsoo's house.

Thus, according to the present invention, translation may be performed without damage to an original text, unlike current machine learning-based neural machine translation (NMT).

When a syntactic structure of the original text is determined in the synapper model, translations in all languages may be generated in this structure.

Since translations are extracted while maintaining human-made sentences, the translations become natural and correct.

In addition, the method and system according to the present invention do not use big data, thereby eliminating a learning process.

A machine learning-based SMT or NMT algorithm requires separate learning for specific languages. By way of example, Naver Papago is good at translation of English to Korean and Korean to English, which provide a lot of learned data, but provides poor translation performance in other language combinations, such as Uzbek->Vietnamese and the like. However, the natural language processing method using a synapper model according to the present invention may be basically applied to all languages, thereby solving the problem of poor translation performance.

In addition, since the synapper model SMU can determine an exact structure of each sentence, the synapper model can also have information about the meaning of each sentence. Just as many things become possible when a genetic structure is determined, things having been previously impossible or difficult become possible when the structure of a sentence is determined. That is, by analyzing the structure of the sentence, it is possible to determine whether the sentence is a positive or negative expression.

Accordingly, since the machine learning-based algorithm does not require power consumption or computing power, a simple task can be sufficiently processed using a general smartphone. Therefore, natural language processing is possible on a user device without Internet access. If there is a need for rapidly processing a large number of sentences, much faster performance can be achieved by designing the above process in a hardware chip.

In conclusion, according to the present invention, natural language processing using a synapper model unit can be performed with high accuracy and consistency at a high speed even without big data.

The above system according to the present invention may be implemented as a hardware component, a software component, and/or a combination of hardware and software components. For example, the processing system may run an operating system (OS) and at least one software application running on the operating system. In addition, the processing system may also access, store, manipulate, process, and generate data in response to execution of software. For convenience of understanding, although one processing device is sometimes described, a person having ordinary knowledge in the art will recognize that the processing system may include a plurality of processing elements and/or a plurality of types of processing elements. For example, the processing system may include a plurality of processors or one processor and one controller. Other processing configurations such as parallel processors are also possible.

Software may include a computer program, code, instructions, or a combination thereof, which configures the processing system to operate as desired or is independently or collectively operated in the processing system. The software and/or data may be embodied in any kind of machine, component, physical device, virtual equipment, computer storage medium or device, to be interpreted by a processing device or to provide instructions or data to the processing system. The software may be distributed over networked computer systems to be stored or executed in a distributed manner. The software and data may be stored in at least one computer-readable recording media.

The method according to the embodiments may be realized in the form of program instructions which can be implemented through various computer components, and may be recorded in a computer-readable storage medium. The computer-readable storage medium may include a program instruction, a data file, a data structure, and the like either alone or in combination thereof. The program instruction recorded in the computer-readable storage medium may be any program instruction particularly designed and structured for the present disclosure or known to those skilled in the field of computer software. Examples of the computer-readable storage medium include magnetic recording media, such as hard disks, floppy disks and magnetic tapes, optical data storage media, such as CD-ROMs and DVD-ROMs, magneto-optical media, such as floptical disks, and hardware devices, such as read-only memory (ROM), random-access memory (RAM), and flash memory, which are particularly structured to store and implement the program instruction. Examples of the program instruction include not only machine language code generated by a compiler but also high level language code which can be executed by a computer using an interpreter. The hardware devices may be configured to be operated by one or more software modules or vice versa to perform the processes according to the present invention.

Although some embodiments of the natural language processing system and method using a synapper model unit according to the present have been described herein, it will be understood that various modifications, changes, and alterations can be made by those skilled in the art without departing from the spirit and scope of the invention. Therefore, the scope of the present invention should be defined by the appended claims and equivalents thereto, rather than limited to the foregoing embodiments.

That is, it will be understood that the foregoing embodiments are provided for illustration only and are not to be in any way construed as limiting the present invention, that the scope of the present invention is defined by the appended claims rather than the detailed description herein, and that the appended claims and equivalents thereto are intended to cover such modifications, changes, and alterations as would fall within the scope and spirit of the invention.

<List of Reference numerals>
100: CPU (Central Processing Unit)
110: Input unit
120: Analog-to-digital converter (ADC)
160: First code converter (WNC: Word-to-NCC Converter)
170: Second code converter (NWC: NCC-to-Word Converter)
180: Digital-to-analog converter (DAC)
190: Output unit
200: Language processing unit (LPU)
210: Control unit
220: Register
230: Synapper model unit (SMU)
240: Cache memory
310: Text random access memory (TRAM)
320: Flash memory

I claim:

1. A natural language processing method using a synapper model to provide a correct structure to a sentence comprising:
a preprocessing step in which text written or pronounced in a first natural language is received and converted into a first sentence comprised of a plurality of words in the first natural language;
a first conversion step in which the first sentence is converted into a plurality of neural concept codes through a first code converter (WNC), wherein each of the plurality of neural concept codes provides sufficient information to determine a part of speech and a meaning for a corresponding word of each of the plurality of words;
a step of creating synapper model data in a computer-readable storage medium for the plurality of neural concept codes, wherein the synapper model data is in the form of main loop data and data for one or more branches;
wherein the main loop data is in the form of data for one of six sentence word orders of: (a) subject-object-verb, (b) subject-verb-object, (c) object-verb-subject, (d) verb-object-subject, (e) verb-subject-object, and (f) object-subject-verb, wherein the subject, object and verb are connected in a circular shape, and wherein the sentence word orders (a), (c), and (e) move in a clockwise direction, and the sentence word orders (b), (d), and (f) move in a counterclockwise direction;
wherein the step of creating the synapper model data includes determining whether each of the plurality of neural concept codes is a node or a branch, wherein a node is one of either a subject, an object or a verb of the main loop data; and
wherein the data for the one or more branches includes data for one or more supplementary words related to a particular node of the main loop data.

2. The natural language processing method according to claim 1, wherein each of the plurality of neural concept codes is a decimal number code.

3. The natural language processing method according to claim 2, wherein each of the decimal number codes has digits which represent a part of speech.

4. The natural language processing method according to claim 1, wherein the information to determine the part of speech of each of the plurality of neural concept codes is used, at least in part, to determine the synapper model data for the plurality of neural concept codes.

5. The natural language processing method according to claim 1, wherein after all words of the first sentence are converted into the plurality of neural concept codes (NCC) in the first conversion step, a syntactic structure of the first sentence is used, at least in part to determine the synapper model data.

6. The natural language processing method according to claim 1, further comprising storing the synapper model data in a cache memory temporarily.

7. The natural language processing method according to claim 1, further comprising storing the synapper model data in a text random access memory (TRAM).

8. The natural language processing method according to claim 1, further comprising storing the synapper model data in a flash memory.

9. The natural language processing method according to claim 1, wherein, it is determined whether each of the plurality of neural concept codes is a node or a branch by what a neural concept code or codes of the plurality of neural concept codes are adjacent to each neural concept code of the plurality of neural concept codes in a text string and by information for part of speech for each of the plurality of neural concept codes.

10. The natural language processing method according to claim 1, wherein, the synapper model data includes data which shows connection between adjacent nodes of the main loop data and which shows connection between each branch and its particular node of the main loop data.

11. A natural language processing system using a synapper model to provide a correct structure to a sentence, comprising:
an input unit to which a first natural language is input;
an analog-to-digital converter (ADC) converting analog data input to the input unit into digital data;
a first code converter (WNC) converting the digital data into a plurality of neural concept codes;
a language processing unit configured to receive the neutral concept codes from the first code converter (WNC) and configured to create synapper model data for the plurality of neural concept codes, wherein the synapper model data is in the form of main loop data and data for one or more branches;
wherein the main loop data is in the form of data for one of six sentence word orders of: (a) subject-object-verb, (b) subject-verb-object, (c) object-verb-subject, (d) verb-object-subject, (e) verb-subject-object, and (f) object-subject-verb, wherein the subject, object and verb are connected in a circular shape, and wherein the sentence word orders (a), (c), and (e) move in a clockwise direction, and the sentence word orders (b), (d), and (f) move in a counterclockwise direction;

wherein the language processing unit is configured to create the synapper model data, at least in part, by determining whether each of the plurality of neural concept codes is a node or a branch, wherein a node is one of either a subject, an object or a verb of the main loop data; and wherein the data for the one or more branches includes data for one or more supplementary words related to a particular node of the main loop data.

12. The natural language processing method of claim 1 wherein wherein the first sentence has one of the six sentence word orders;

and further comprising forming a second sentence based on the synapper model data, wherein the second sentence is in a second natural language, which differs from the first natural language, and wherein the second sentence has a different order of the six sentence word orders from the first sentence.

13. The natural language processing system of claim 11 further comprising a second code converter (NWC) which converts the plurality of neural concept codes into digital data representing a sentence in a second natural language;

a digital-to-analog converter (DAC) which converts the digital data representing the sentence in the second natural language into analog data; and an output unit including a display configured to output the analog data in the second natural language.

14. The natural language processing system of claim 11 further comprising a second code converter (NWC) which converts the plurality of neural concept codes into digital data representing a sentence in a second natural language;

a digital-to-analog converter (DAC) which converts the digital data representing the sentence in the second natural language into analog data; and an output unit including a speaker configured to output the analog data in the second natural language.

15. The method of claim 1 wherein the synapper model data includes data indicating a basic noun phrase which is a subject node, data indicating a basic verb phrase which is a verb node, data indicating a sub-predicate which is an object node, and a data indicating a complementary element which is a branch.

16. The method of claim 1 wherein the synapper model data includes data indicating what the first natural language is.

17. The method of claim 1 wherein the synapper model data includes data indicating which of the six sentence word orders the first sentence is in.

18. The natural language processing method of claim 1 wherein each of the plurality of neural concept codes is a binary number code.

19. The natural language processing method of claim 18 wherein the binary number code has digits which represent a part of speech.

\* \* \* \* \*